US009124358B2

(12) United States Patent
Pahlavan et al.

(10) Patent No.: US 9,124,358 B2
(45) Date of Patent: Sep. 1, 2015

(54) PASSIVE WIRELESS CONNECTION

(76) Inventors: Kourosh Pahlavan, Palo Alto, CA (US); Farokh Hassanzadeh Eskafi, Palo Alto, CA (US)

(*) Notice: Subject to any disclaimer, the term of this patent is extended or adjusted under 35 U.S.C. 154(b) by 272 days.

(21) Appl. No.: 13/306,918

(22) Filed: Nov. 29, 2011

(65) Prior Publication Data

US 2012/0134389 A1 May 31, 2012

Related U.S. Application Data

(60) Provisional application No. 61/417,560, filed on Nov. 29, 2010.

(51) Int. Cl.
*H04B 1/69* (2011.01)
*H04B 1/7163* (2011.01)
*H01H 9/16* (2006.01)

(52) U.S. Cl.
CPC ............ *H04B 1/71635* (2013.01); *H01H 9/167* (2013.01); *H01H 2300/032* (2013.01); *Y02B 90/224* (2013.01); *Y04S 20/14* (2013.01)

(58) Field of Classification Search
CPC ................ Y04S 20/14; Y02B 90/224; H01H 2300/032; H01H 9/167; H04B 1/71635; H02H 3/04; G08B 17/06; F25D 29/008; G01R 31/343
USPC ............. 340/12.3, 10.1, 572.1, 3.1, 3.31, 3.4, 340/10.5, 500, 540, 593, 635, 644
See application file for complete search history.

(56) References Cited

U.S. PATENT DOCUMENTS

| | | | |
|---|---|---|---|
| 6,806,808 B1* | 10/2004 | Watters et al. | 340/10.41 |
| 7,180,421 B2* | 2/2007 | Pahlaven et al. | 340/572.1 |
| 7,246,062 B2* | 7/2007 | Knott et al. | 704/246 |
| 7,777,623 B2* | 8/2010 | Albsmeier et al. | 340/539.26 |
| 8,742,900 B2* | 6/2014 | Burr | 340/10.33 |
| 2003/0080862 A1* | 5/2003 | Kranz | 340/442 |
| 2005/0052287 A1* | 3/2005 | Whitesmith et al. | 340/825.72 |
| 2005/0248438 A1* | 11/2005 | Hughes et al. | 340/10.4 |
| 2005/0280539 A1* | 12/2005 | Pettus | 340/572.1 |
| 2006/0103533 A1* | 5/2006 | Pahlavan et al. | 340/572.1 |
| 2006/0103535 A1* | 5/2006 | Pahlaven et al. | 340/572.1 |
| 2006/0121851 A1* | 6/2006 | Moore et al. | 455/41.2 |
| 2006/0139168 A1* | 6/2006 | Pratt et al. | 340/539.22 |
| 2006/0154642 A1* | 7/2006 | Scannell | 455/404.1 |
| 2007/0152833 A1* | 7/2007 | Kaplan et al. | 340/572.8 |
| 2007/0229250 A1* | 10/2007 | Recker et al. | 340/531 |
| 2007/0259690 A1* | 11/2007 | Julian et al. | 455/557 |
| 2008/0003945 A1* | 1/2008 | Wenham | 455/41.2 |
| 2009/0167484 A1* | 7/2009 | Burr | 340/3.31 |
| 2010/0328043 A1* | 12/2010 | Jantunen et al. | 340/10.3 |
| 2011/0304439 A1* | 12/2011 | Panchalan et al. | 340/10.3 |
| 2012/0134389 A1* | 5/2012 | Pahlavan et al. | 375/130 |
| 2012/0256733 A1* | 10/2012 | Carr | 340/10.51 |

* cited by examiner

*Primary Examiner* — Brian Zimmerman
*Assistant Examiner* — An T Nguyen
(74) *Attorney, Agent, or Firm* — TIPS Group

(57) ABSTRACT

A wireless switch or sensor is provided that includes a radio frequency (RF) transponder including a narrowband receiver operable to generate power from a received narrowband RF signal and an ultra wideband (UWB) transmitter operable to transmit UWB pulses using the generated power.

13 Claims, 5 Drawing Sheets

PASSIVE WIRELESS CONNECTION

RELATED APPLICATION

This application claims the benefit of U.S. Provisional No. 61/417,560, filed Nov. 29, 2010, the contents of which are hereby incorporated by reference in their entirety.

TECHNICAL FIELD

This application relates to wireless sensor and switch networks.

BACKGROUND

Environments such as homes and offices require numerous switches for actuating devices such as lamps and HVAC equipment. A conventional home thus includes costly wiring between all the switch controls and the various power sinks such as lights, heaters, computers, radio and TV sets, and so on. In addition to the cost associated with wires, maintenance and installations, positioning of the switches and fixtures need to be predetermined at the time of installation. In mobile environments such as cars other factors like the weight of the copper saved in the wiring of the switches is, in and of itself, enough motivation for having a wireless network of passive switches. Copper wiring is not only expensive but also heavy; saving copper results in lower manufacturing cost and better fuel economy.

Inside cars and similar environments, the position of switches, control knobs and sensors is crucial in maintaining functional, user-friendly operation and esthetically appealing instrumentation layout. The esthetic aspects of such placements as well as the practical difficulties in providing wired connections to all such switches and sensors, e.g. through the steering wheel and hard to reach structures, present considerable design difficulties.

To eliminate the cost of installing wires between the switch and the device being actuated by the switch, various wireless switches have been developed. Similarly, wireless sensors have been developed to eliminate the need for wires between the sensors and the control systems requiring information from the sensors. One type of conventional wireless switches uses a narrowband data link to power up the switch such that the switch can manipulate the narrowband incident signal or field to convey the switch state accordingly. Such wireless switches include traditional passive radios such as backscattering or magnetically coupling RFID transponders.

Another group of solutions use a transducer to convert the mechanical energy imparted by the user actuating the switch into the required electrical energy needed for generating a narrowband RF carrier, see e.g. U.S. Pat. No. 7,245,062. But both conventional narrowband RFID approaches and transducer approaches suffer from multipath and sensor collisions.

Accordingly, there is a need in the art for improved wireless switches and sensors.

SUMMARY

In accordance with a first aspect of the disclosure, a wireless switch is provided that includes: a radio frequency (RF) transponder including a narrowband receiver operable to generate power from a received narrowband RF signal and an ultra wideband (UWB) transmitter operable to transmit UWB pulses using the generated power; and a switch, wherein the RF transponder couples to the switch to sense an on or off switch state for the switch, and wherein the UWB transmitter modulates the transmitted UWB pulses to transmit the sensed switch state.

In accordance with a second aspect of the disclosure, a wireless sensor is provided that includes: a radio frequency (RF) transponder including a narrowband receiver operable to generate power from a received narrowband RF signal and an ultra wideband (UWB) transmitter operable to transmit UWB pulses using the generated power; and a sensor, wherein the RF transponder couples to the sensor to receive a sensor state for the sensor, and wherein the UWB transmitter modulates the transmitted UWB pulses to transmit the sensor state.

BRIEF DESCRIPTION OF THE DRAWINGS

FIG. 5b illustrates an interior view for the system of FIG. 5a.

DETAILED DESCRIPTION

Figure 1:
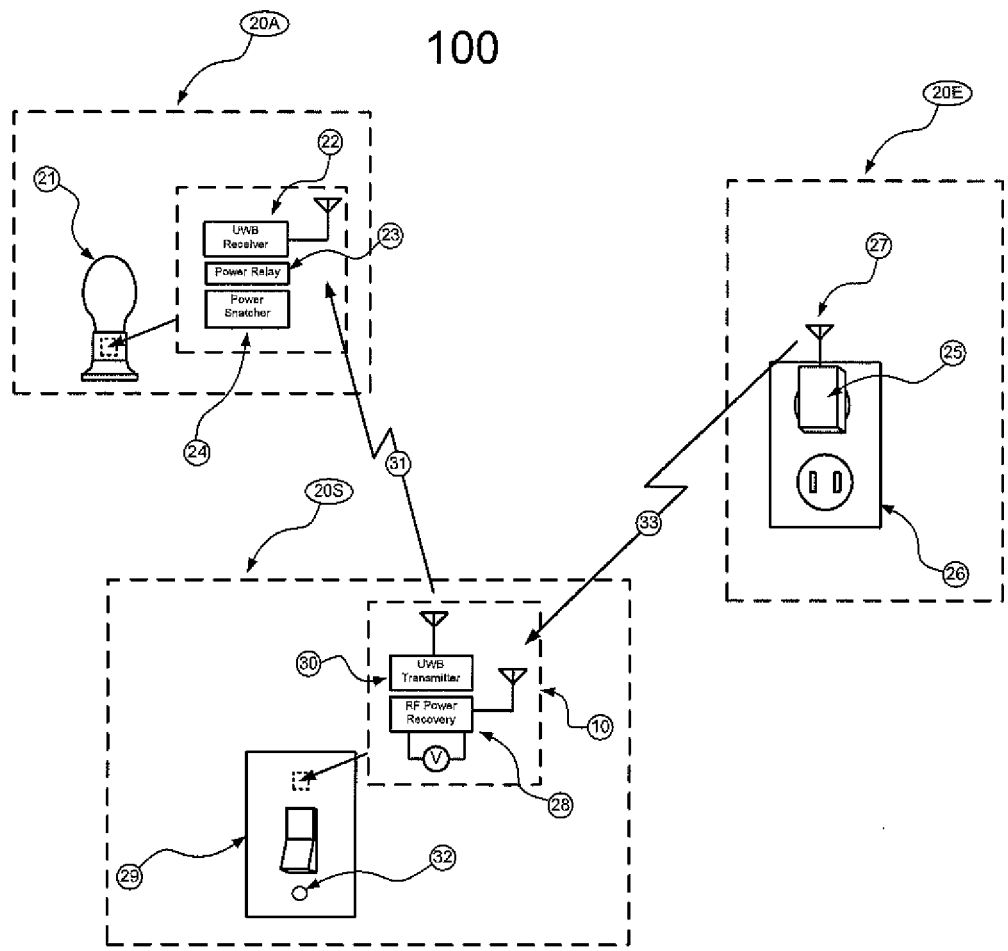
FIG. 1 shows an example wireless switch system.

A passive ultra wideband (UWB) RFID transponder provides a cost-effective wireless switch and sensor solution. Unlike the prior art narrowband RFID and transducer prior art approaches, the present UWB approach requires much lower power yet offers much more robust collision avoidance and range performance. Turning now to the drawings, FIG. 1 shows an example wireless switch system 100.

A wireless switch 20S includes a dual-band radio frequency transponder 10 that senses the on or off state of a switch 29. Transponder 10 is analogous to the asymmetric communication bandwidth transponder disclosed in commonly-assigned U.S. Pat. No. 7,180,421, the contents of which are incorporated by reference in their entirety, in that transponder 10 may receive a narrowband excitation signal from which it scavenges power for the transmission of ultra wideband (UWB) pulses 31. In that regard, a narrowband exciter 20E provides a narrowband CW excitation signal 33 to power transponder 10 in one embodiment. However, transponder 10 need not be powered by RF but could scavenge power by other means such as through a photovoltaic cell 32 or through conversion of sound and other vibrations. In that regard, transponder 10 could couple to a plurality of different power sources. The following discussion focuses on an RE-powered embodiment but it will be appreciated that other means of powering transponder 10 are within the scope of the disclosure.

In contrast to the asymmetric communication bandwidth transponder disclosed in U.S. Pat. No. 7,180,421, exciter 20E is not interrogating transponder 10 but instead is merely providing power. Moreover, transponder 10 does not respond with respect to any interrogation from exciter 20E but instead uses the received power from narrowband excitation signal 33 to transmit a switch state using UWB pulses 31. A lamp 21 responds to the switch state as discussed further herein. In contrast, the asymmetric communication bandwidth transponder disclosed in U.S. Pat. No. 7,180,421 receives instructions from a narrowband interrogator but then responds to the interrogator using UWB pulses.

Narrowband excitation signal 33 involves a continuous wave (CW) or tone. The continuous carrier wave could be modulated as discussed further herein with regard to sensor embodiments. However, no modulation of excitation signal 33 is necessary in wireless switch embodiments. In contrast to narrowband excitation signal 33, UWB pulses 31 do not involve the transmission of a continuous wave (CW) or tone. As known in the UWB arts, a UWB signal has a bandwidth of 500 MHz or more. UWB pulses 31 thus comprise a Time Doman Carrierless Impulse Radio (TDCIR) signal with a fractional bandwidth of greater than or equal to 10%. The generation of UWB pulses requires relatively little power, which is quite advantageous in that CW exciter 20E may transmit at relatively low power in that the generation of UWB pulses 31 by a UWB transmitter 30 requires just a few microwatts of power. Low power narrowband excitation is desirable is applications for offices, homes, automobiles, etc. in which there is close proximity to human beings. In that regard, exciter 20E may pulse width modulate narrowband excitation signal 33 to further reduce the transmitted power. Transponder 10 requires just a few microwatts of power to generate UWB pulses 31. An RF power recovery circuit 28 receives narrowband CW signal 33 to generate power for UWB transmitter 30. Such narrowband reception enables system 100 to power transponder 10 without interfering with other radio systems.

Lamp 21 may be considered to represent a generic actuator 20A that is actuated though operation of switch 29. An ultra wideband (UWB) receiver 22 detects the transmission of UWB pulses 31 to drive a power relay 23 accordingly. Lamp 21 is then illuminated or turned off accordingly to the on or off state of switch 29 though operation of power relay 23. Since power relay 23 powers lamp 21 through an AC mains, a power converter 24 may convert the AC power into the appropriate DC voltages for powering UWB receiver 22. It will be appreciated, however, that UWB receiver 22 may be powered through other means such as the use of a photovoltaic cell (not illustrated).

Exciter 20E includes a narrowband RF power transmitter 25 that in one embodiment may be simply plugged into an AC mains outlet 26 with an antenna 27 directed towards transponder 10. In other embodiments, transmitter 25 may be powered by a battery or through a photovoltaic cell. Should transponder 10 have an option of receiving power from a photovoltaic source 32, transmitter 25 could include a light sensor (not illustrated) to detect when there is sufficient ambient light to drive transponder 10. Transmitter 25 would thus generate narrowband excitation signal 33 only when ambient light conditions are insufficient to power transponder 10. RF excitation is however a deterministic source of power for transponder 10, as ambient phenomena are typically unreliable and may not always be available.

Figure 2:
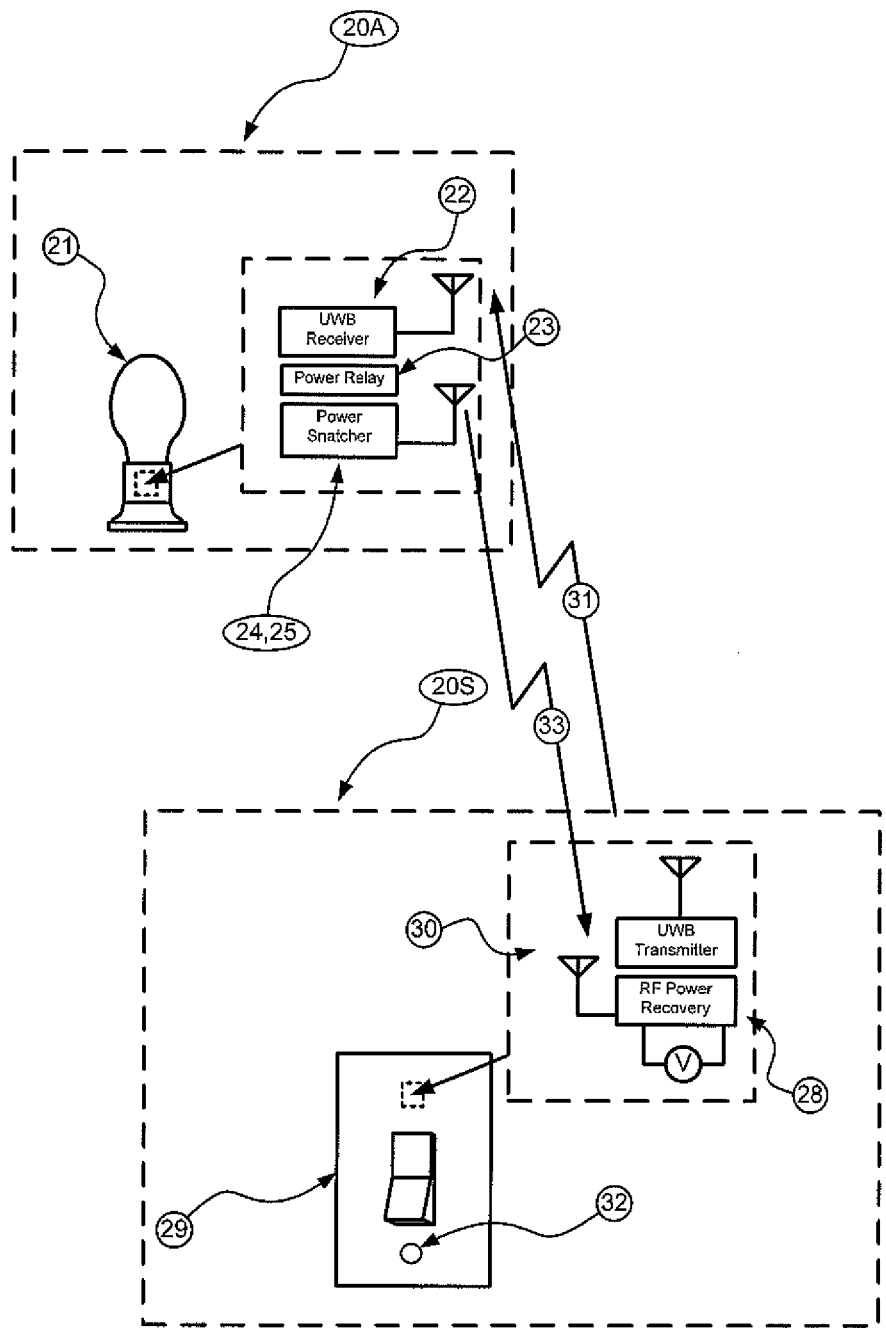
FIG. 2 shows an alternative wireless switch system embodiment in which the narrow band RF transmitter is integrated with the actuator.

Narrowband RF power transmitter 25 may be integrated with actuator 20A as shown in FIG. 2. In this embodiment, power converter 24 also acts as narrowband RF power transmitter 25 to generate narrowband excitation signal 33. The remaining components in FIG. 2 act as discussed with regard to FIG. 1.

Figure 3:
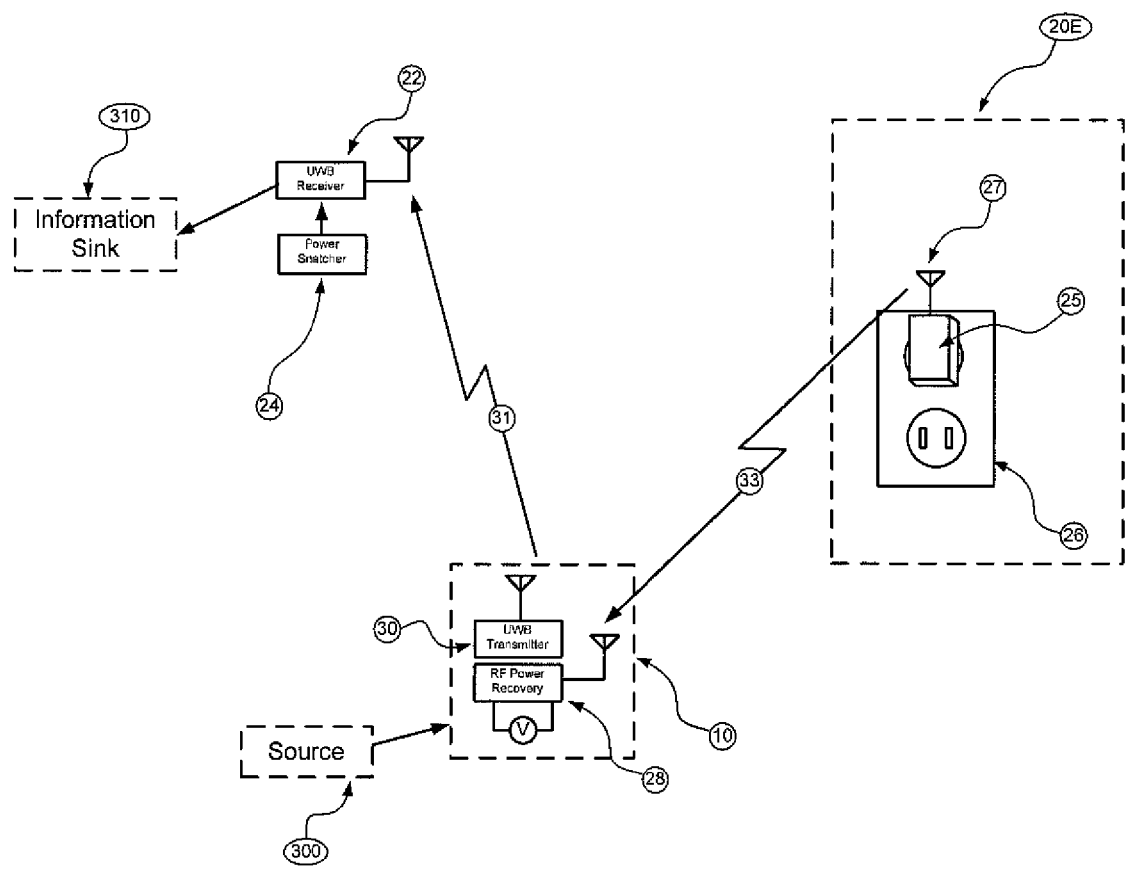
FIG. 3 illustrates an example wireless sensor system.

Lamp 21 may be considered to form a power sink that is coupled to a power source through action of wireless switch 20S. But note that wireless switch 20S may also be regarded to act as a wireless sensor in that transponder 10 wirelessly transmits the sensed state of switch 29. FIG. 3 thus illustrates an alternative embodiment in which switch 29 could be replaced by an information source or sensor 300 such as a thermometer, strain gauge, and so on. Transponder 10 would then transmit UWB pulses 31 to communicate the desired information such as a sensor state. Lamp 21 would similarly be replaced by a control system 310 or some other entity that acts as an information sink for the information generated by source 300. UWB receiver 22 thus demodulates UWB pulses 31 to obtain the desired information and provides the information to sink 310 accordingly. But note that a wireless sensor will not normally transmit sensor information continuously. Thus, transponder 10 may be triggered to transmit sensor information upon interrogation as applied through modulation of narrowband excitation signal 33. If desired, however, transponder 10 may continuously transmit sensor information whenever sufficient power is available without any triggering through excitation signal 33.

Figure 4:
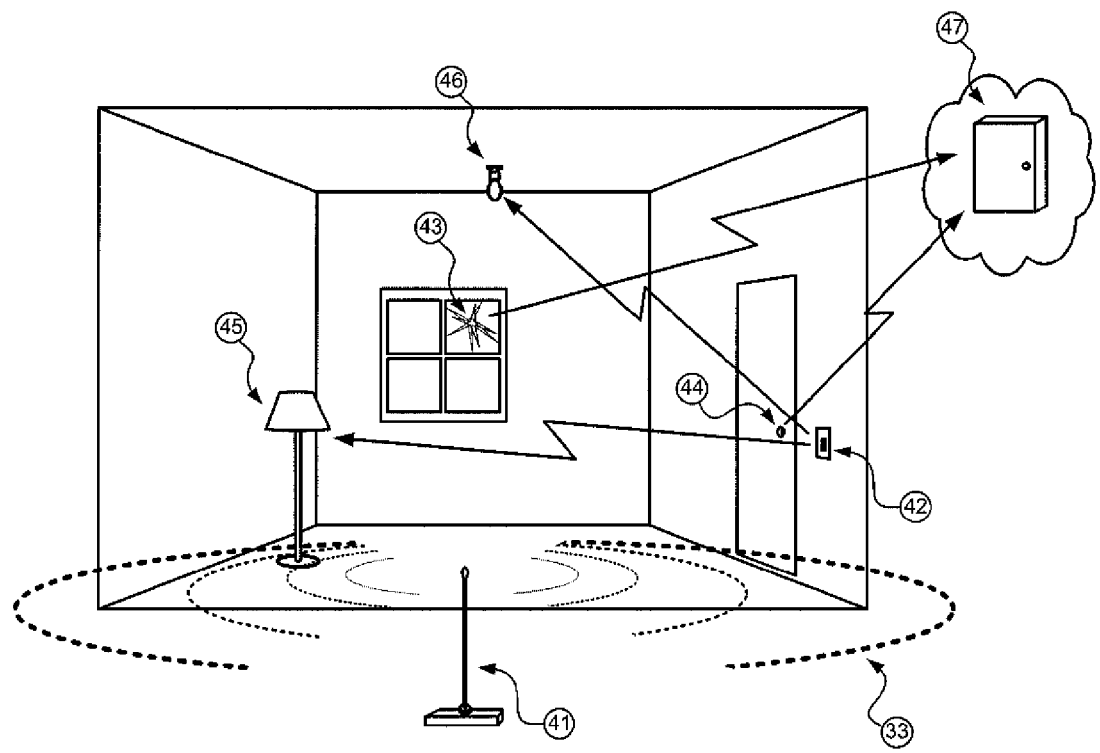
FIG. 4 illustrates an example wireless sensor and switch system for a home or office environment.

FIG. 4 shows an embodiment of the invention applied to a living environment involving both switches and sensors. One or more narrowband transmitters 41 transmit narrowband RF excitation signal 33 analogously as discussed with regard to transmitter 25 of FIGS. 1-3. This narrowband transmission powers up wireless sensors 43 and 44 as well as wireless switch 42. Sensors 43 and 44 transmit sensor information to an alarm control system 47. Similarly, wireless switch 42 controls lamps 46 and 45. It will be appreciated that a media access control (MAC) may be implemented when there are multiple transponders in the same environment. Any suitable modulation may be used to transmit switch state and identity as well as sensor state and identity. For example, pulse position modulation may be used to send this information using UWB pulses 31.

Figure 5A:
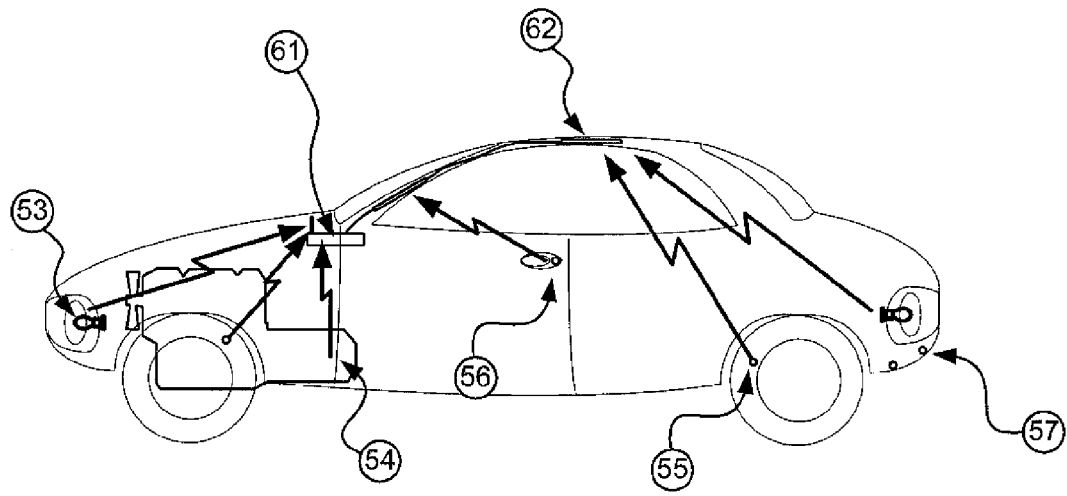
FIG. 5a illustrates a side view of an example wireless sensor and switch system for a motor vehicle.
Figure 5B:
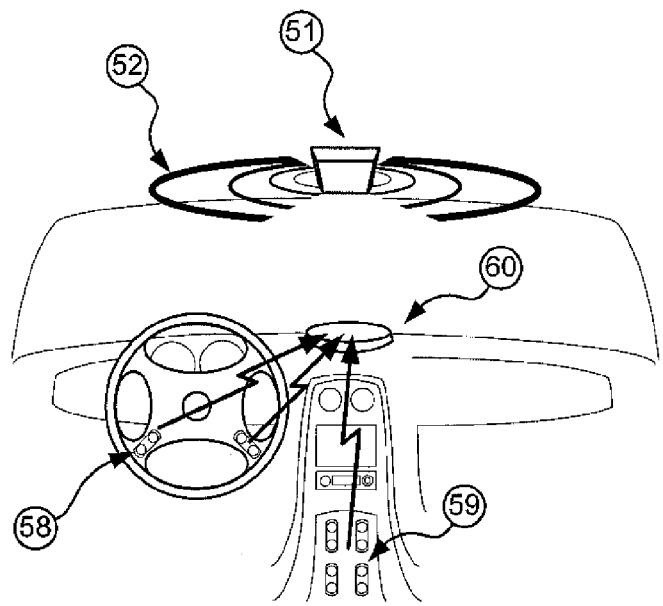

FIG. 5a illustrates a vehicle wireless sensor/switch embodiment. Advantageously, switches and sensors in the car are completely free from any wires and can be placed anywhere in the car and the instrument panel. As shown in FIG. 5b, a continuous wave transmitter(s) 51 is strategically located inside the car to propagate CW RF energy 52 that energizes all the sensors and switches 53, 54, 55, 56, 57, 58, 59 for the car and the responses from these sensors and switches are captured by a UWB receiver or receivers with antennas 60, 61, 62 distributed in strategic positions in the car. The UWB receiver will then interface to an appropriate actuator control system such as the automotive CAN bus controller or directly to the actuators themselves to control them. Some sensors are integrated into the actuators. For example a bulb is an actuator in that it is turned on or off, but it is also a sensor in that it can indicate whether it is functional or damaged.

Another embodiment of this invention is its implementation in a Personal Area Network where for example a smart-phone or a wrist band is used to interact with devices that are passive and can be powered by the smart-phone and thereby respond to its requests.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A wireless switch system comprising:
   an exciter powered by an alternating current (AC) mains and transmitting an always available, unmodulated, continuous wave (CW) narrowband RF excitation signal;

a radio frequency (RF) transponder including a narrowband receiver operable to develop a generated power from the narrowband RF excitation signal and an ultra wideband (UWB) transmitter powered by the always available generated power of the narrowband receiver, the UWB transmitter having a bandwidth of at least 500 MHz and being operative to transmit RF UWB pulses;

a switch, wherein the RF transponder is coupled to the switch to sense an on-or-off sensed switch state, and wherein the UWB transmitter modulates the transmitted UWB pulses to comprise a Time Doman Carrierless Impulse Radio (TDCIR) signal with a fractional bandwidth of greater than or equal to 10% to transmit the sensed switch state, whereby the transmitted UBW pulses are not a continuous wave signal; and an actuator including a UWB receiver adapted to receive the transmitted UBW pulses.

2. The wireless switch system of claim 1 further comprising a photovoltaic cell operable to provide power to the UWB transmitter.

3. The wireless switch system of claim 1 further comprising a transducer operative to provide power to the UWB transmitter.

4. The wireless switch system of claim 1, wherein the actuator further includes a lamp coupled to the UWB receiver.

5. The wireless switch system of claim 4 wherein the lamp is powered by an alternating current (AC) mains.

6. The wireless switch system of claim 5 further comprising a power relay coupling the lamp to the UWB receiver.

7. A wireless sensor system comprising:
an exciter powered by an alternating current (AC) mains and transmitting an always available, unmodulated, continuous wave (CW) narrowband RF excitation signal;
a sensor having a sensor state;
a radio frequency (RF) transponder including a narrowband receiver operable to develop a generated power from the narrowband RF excitation signal and an ultra wideband (UWB) RF transmitter powered by the always available generated power of the narrowband receiver, wherein the UWB transmitter has a bandwidth of at least 500 MHz and is operative to transmit UWB pulses, wherein the RF transponder is coupled to the sensor to receive sensor information including the sensor state, and wherein the UWB transmitter modulates the transmitted UWB pulses to comprise a Time Doman Carrierless Impulse Radio (TDCIR) signal with a fractional bandwidth of greater than or equal to 10% to transmit the sensor information, such that the transmitted UBW pulses are not a continuous wave signal;
a UWB receiver adapted to receive and demodulate the UWB pulses to derive the sensor information; and
an information sink coupled to the UWB receiver to act upon the sensor information.

8. The wireless sensor system of claim 7 further comprising a photovoltaic cell operable to provide power to the UWB transmitter.

9. The wireless sensor system of claim 7 further comprising a transducer operative to provide power to the UWB transmitter.

10. The wireless sensor system of claim 7 wherein the information sink comprises a control system.

11. The wireless sensor system of claim 7 wherein the sensor is a thermometer.

12. The wireless switch system of claim 1 wherein the UWB transmitter is configured to modulate the transmitted UWB pulses using pulse position modulation.

13. The wireless sensor system of claim 7 wherein the UWB transmitter is configured to modulate the transmitted UWB pulses using pulse position modulation.

* * * * *